United States Patent [19]

Kotani et al.

[11] Patent Number: 4,626,873

[45] Date of Patent: Dec. 2, 1986

[54] RECORDING HEAD SUPPORT

[75] Inventors: Matahira Kotani; Masafumi Matsumoto; Hiroshi Shirakoshi, all of Nara, Japan

[73] Assignee: Sharp Kabushiki Kaisha, Osaka, Japan

[21] Appl. No.: 787,512

[22] Filed: Oct. 15, 1985

[30] Foreign Application Priority Data

Nov. 13, 1984 [JP] Japan ........................... 59-172510[U]

[51] Int. Cl.[4] ........................... G01D 15/16; B41J 3/20

[52] U.S. Cl. ........................... 346/139 R; 346/76 PH; 346/139 C; 400/120

[58] Field of Search .......... 346/76 PH, 139 C, 139 R; 400/120

[56] References Cited

U.S. PATENT DOCUMENTS

| | | | |
|---|---|---|---|
| 4,145,698 | 3/1979 | Wysong | 346/139 R |
| 4,151,397 | 4/1979 | Boor, Jr. et al. | 219/216 X |
| 4,235,555 | 11/1980 | Aprato | 400/120 |
| 4,297,039 | 10/1981 | Lees | 400/120 |
| 4,507,666 | 3/1985 | Kondo et al. | 346/76 PH |

*Primary Examiner*—E. A. Goldberg

*Assistant Examiner*—Gerald E. Preston

*Attorney, Agent, or Firm*—Flehr, Hohbach, Test, Albritton & Herbert

[57] ABSTRACT

A recording head device comprises a roller, a recording head disposed opposite to this roller, a securing member, a frame with a hole, a pin passing through this hole in contact with the securing member, and a supporting means for supporting the recording head, having an elongate hole and being engaged by the pin between the securing member and the frame so that a small relative motion caused, for example, by deformation of the device is allowed between the securing member and the recording head and a uniform pressure can be maintained between the roller and the recording head.

2 Claims, 2 Drawing Figures

RECORDING HEAD SUPPORT

Figure 1:
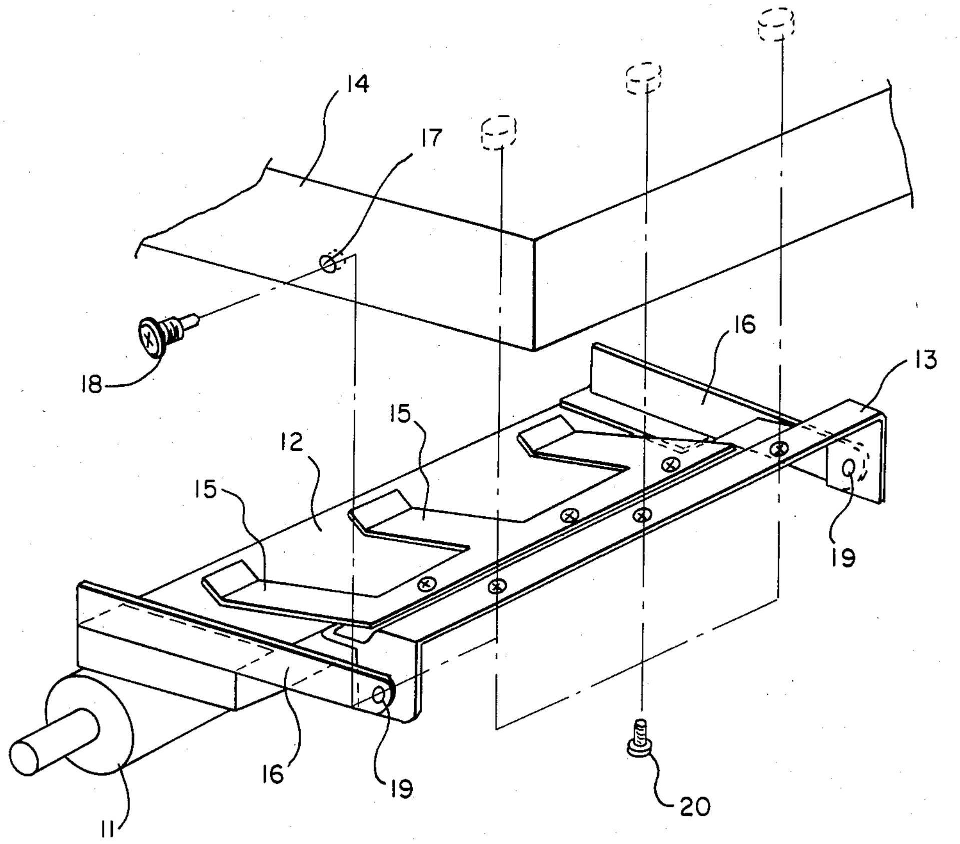

This invention relates to a recording head device which serves to press a recording head of a facsimile, printer, etc. against its recording medium.

As is well known, a recording head device for a recording head is generally so structured that the recording head is pressed by a supporting member against a roller disposed opposite thereto. Such a supporting member is generally supported by pins which penetrate it through holes provided thereto, but the axial direction of the pins must be kept parallel to the extension of the roller. If the device becomes deformed and this direction ceases to remain parallel to the roller, the compressive force between the roller and the recording head connected to the aforementioned supporting member becomes uneven and uniformity may be lost between the roller and the recording head.

It is therefore an object of the present invention in view of the above to provide an improved recording head device capable of maintaining a uniform pressure between the recording head and the roller, thereby eliminating density fluctuations caused by the nonuniformity in this pressure.

The above and other objects of the present invention are attained by providing a recording head device comprising a roller, a recording head disposed opposite the roller, a securing member, a frame with a hole, a pin passing through this hole in contact with the securing member, and a supporting member for supporting the recording head. The supporting member has an elongate hole and is engaged by the pin between the securing member and the frame so that a small relative motion is allowed between the securing member and the recording head.

Figure 2:
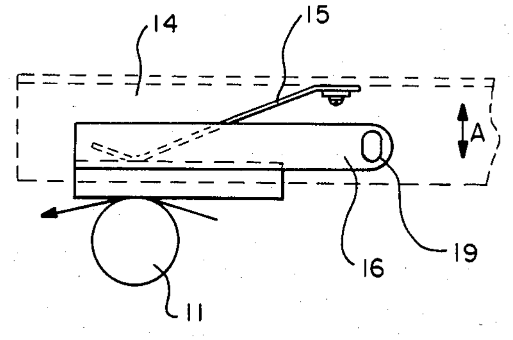

The accompanying drawings, which are incorporated in and form a part of the specification, illustrate an embodiment of the present invention and, together with the description, serve to explain the principles of the invention. In the drawings:

FIG. 1 is a diagonal, partially exploded view of a recording head device according to one embodiment of the present invention, and FIG. 2 is a side view of a section of the recording head device of FIG. 1.

As shown in the figures, a recording head device embodying the present invention includes a roller 11, a recording head 12 such as a thermal head disposed opposite to the roller 11, a securing member 13 and a frame (or a sub-frame) 14. A recording medium (not shown) is adapted to pass between and in contact with the roller 11 and the recording head 12 so that signals corresponding to the image information inputted to the thermal elements of the recording head 12 are transmitted to the recording medium as it passes through this section. Numerals 15 indicate compressive (plate) springs which are attached to the securing member 13 and serve to press the recording head 12 in the direction of the roller 11. Numerals 16 indicate two supporting members attached respectively to each side surface of the recording head 12. Each of the supporting members 16 is provided with a hole 19 so that a positioning pin 18, passing through a hole 17 in the frame 14, penetrates therethrough to rotatably join it with the securing member 13. As shown in FIG. 2, the holes 19 are not exactly circular, but are elongated in the direction (vertical in FIG. 2) in which the recording head 12 compresses the roller 11. The frame 14 is secured to the securing member 13 by means of screw means 20.

Since the hole 19 is elongated, the positioning pin 18 is allowed to move therein with respect to the supporting member 16. If the frame 14 experiences deformation and positioning of the supporting members 16 is affected, displacements (in the direction of the arrows A in FIG. 2) from their specified positions (so that the axial direction of the positioning pin 18 in the hole 17 is parallel to that of the roller 11) may be absorbed by the elongated shape of the holes 19. It goes without saying that the holes 19 additionally serve to determine the axis of rotation for the supporting members 16.

In short, a recording head device of the present invention can absorb the effects of deformations, etc. of the frame supporting the recording head, if they are not too large, so that the pressure on the roller from the recording head can be uniformly maintained and that improved recording quality can be attained.

This invention has been described above by way of only one embodiment but many changes and modifications which may be apparent to a person skilled in the art are intended to be within the scope of this invention.

What is claimed is:

1. A recording head device comprising a roller, a recording head disposed opposite said roller, a securing member, a frame with a hole, a pin passing through said hole in said frame in contact with said securing member, and a supporting member for supporting said recording head, having an elongate hole and being engaged by said pin between said securing member and said frame, whereby a small relative motion is allowed between said securing member and said recording head.

2. The recording head device of claim 1 wherein said pin is parallel to the axis of said roller.

* * * * *